(12) United States Patent
Alacar

(10) Patent No.: US 9,766,847 B1
(45) Date of Patent: Sep. 19, 2017

(54) MANAGEMENT OF AN IMAGE FORMING APPARATUS USING TEST PAGE DATA

(71) Applicant: KYOCERA Document Solutions Inc., Osaka (JP)

(72) Inventor: Arthur Alacar, South Pacheco, CA (US)

(73) Assignee: KYOCERA Document Solutions Inc. (JP)

(*) Notice: Subject to any disclaimer, the term of this patent is extended or adjusted under 35 U.S.C. 154(b) by 0 days.

(21) Appl. No.: 15/070,566

(22) Filed: Mar. 15, 2016

(51) Int. Cl.
   *G06F 3/12* (2006.01)
   *G06K 15/02* (2006.01)
   *H04N 1/00* (2006.01)

(52) U.S. Cl.
   CPC ............ *G06F 3/1289* (2013.01); *G06F 3/121* (2013.01); *G06K 15/027* (2013.01); *H04N 1/00015* (2013.01); *H04N 2201/0084* (2013.01); *H04N 2201/0096* (2013.01)

(58) Field of Classification Search
   None
   See application file for complete search history.

(56) References Cited

U.S. PATENT DOCUMENTS

| | | | |
|---|---|---|---|
| 5,270,775 A | 12/1993 | Suzuki | |
| 6,141,507 A | 10/2000 | Sawada | |
| 2003/0076523 A1* | 4/2003 | Ito | H04N 1/00002 358/1.14 |
| 2007/0086034 A1* | 4/2007 | Morton, III | G06F 3/1207 358/1.13 |
| 2008/0044082 A1* | 2/2008 | Muller | G01J 3/50 382/162 |
| 2012/0206743 A1* | 8/2012 | Murakami | H04N 1/6058 358/1.9 |
| 2013/0299570 A1* | 11/2013 | Ting | G06F 3/1204 235/375 |

* cited by examiner

Primary Examiner — Henok A Shiferaw
(74) Attorney, Agent, or Firm — McDonnell Boehnen Hulbert & Berghoff LLP

(57) ABSTRACT

The present disclosure is directed to a system, a method, and an apparatus that manage an image forming apparatus using test page data. In example embodiments, when a client computing device requires verification of the functionality of an image forming apparatus, the client computing device can initiate a request with a managing server. Through the transmission of a test page print request to the image forming apparatus, a scanning of a test page that is printed by the image forming apparatus, a transmission of data from the printed test page to the managing server, and the managing server verifying the data transmitted by the client computing device, the client computing device and managing server can verify the image forming apparatus.

19 Claims, 13 Drawing Sheets

MANAGEMENT OF AN IMAGE FORMING APPARATUS USING TEST PAGE DATA

BACKGROUND

Unless otherwise indicated herein, the materials described in this section are not prior art to the claims in this application and are not admitted to be prior art by inclusion in this section.

In recent years, various types of printing devices have become popular for both business and consumer use. In addition to traditional black and white printers, color printers, scanners, copiers, fax machines, and other components are now common. Multifunctional products (MFPs), that support two or more of these operations, are also widely available.

Many of these printing devices are shared across multiple client computing devices. In order to manage multiple printing devices shared across multiple client computing devices, managing servers are sometimes used.

The ability for managing servers to perform such tasks as enrolling new printing devices in the network and establishing if an existing networked printing device requires maintenance can be important.

SUMMARY

The present application discloses embodiments that relate to systems, methods, and apparatuses that manage an image forming apparatus using test page data. By printing a test page, evaluating the resulting test page, and comparing it with test print image data established by a managing server, an image forming apparatus' current status can be evaluated.

In one aspect, the present application describes an image forming apparatus management system. The system includes an image forming apparatus configured to print a test page. Additionally, the system includes a client computing device configured to transmit a test print data request to a managing server. The client computing device is also configured to transmit a test page print request to the image forming apparatus. The client computing device is further configured to scan the test page. The client computing device is additionally configured to transmit data scanned from the test page to the managing server. Furthermore, the managing server is configured to transmit test print data to the client computing device. The managing server is also configured to verify the data scanned from the test page against the test print data.

In a different aspect, the present application describes a method for managing an image forming apparatus. The method includes transmitting, by a client computing device, a test print data request to a managing server. The method also includes transmitting, by the managing server, test print data to the client computing device. In addition, the method includes transmitting, by the client computing device, a test page print request to the image forming apparatus. The method further includes printing, by the image forming apparatus, a test page. Furthermore, the method includes scanning, by the client computing device, the test page. Additionally, the method includes transmitting, by the client computing device, data scanned from the test page to the managing server. Still further, the method includes verifying, by the managing server, the data scanned from the test page against the test print data.

In a third aspect, the present application describes an image forming apparatus. The image forming apparatus is configured to transmit a test print data request to a managing server. The image forming apparatus is also configured to print a test page. The image forming apparatus is further configured to scan the test page. The image forming apparatus is additionally configured to transmit data scanned from the test page to the managing server. The managing server is configured to transmit a test page print request to the image forming apparatus. In addition, the managing server is configured to verify the data scanned from the test page against test print image data contained within the test page print request.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
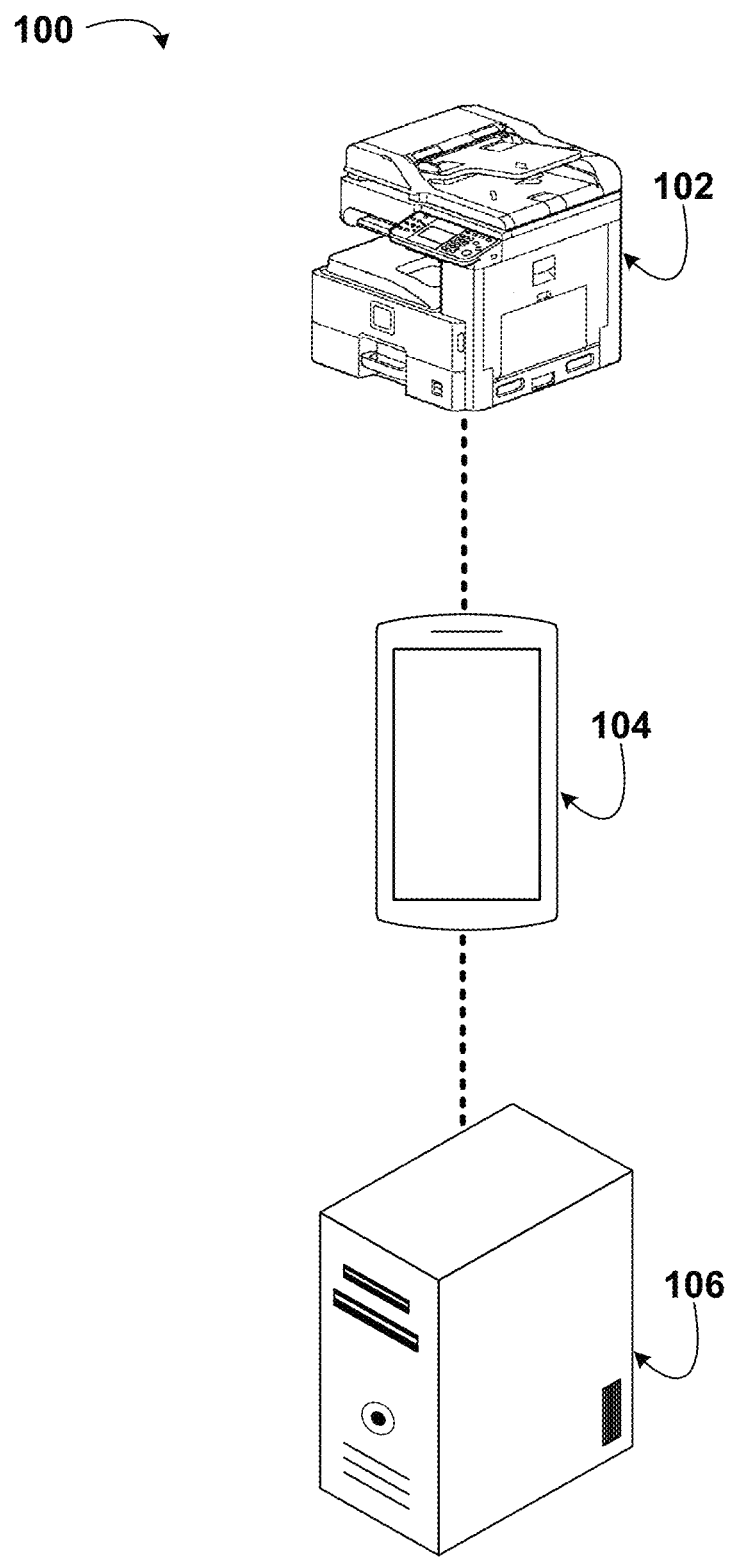
FIG. 1 is an illustration of an image forming system, according to example embodiments.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. In addition, some of the illustrated elements may be combined or omitted. Similarly, an example embodiment may include elements that are not illustrated in the figures.

I. Overview

Example embodiments include a managing server and a client computing device that act to manage an image forming apparatus. This management takes place in the form of the verification, validation, and authentication of a code printed by the image forming apparatus.

In one embodiment, a client computing device initiates a method for verifying an image forming apparatus with a managing server.

This may be done by the client computing device transmitting a request to the managing server to initiate a validation process. Thereafter, the managing server may send test print image data back to the client computing device. The test print image data may contain a code for use in the verification process. This code may, in some embodiments, be a quick response (QR) code.

The client computing device may then transmit the test print image data to the image forming apparatus in the form of a print request. The print request indicates to the image forming apparatus the content of the test print image data that is to be printed.

Then, the image forming apparatus may print the test page requested in the print request. In response to the printing, the client computing device gathers data from the printed test page. This may be done by scanning in the test page, in part or whole, using a camera, for instance. Upon scanning the test page, the client computing device may attempt to extract the contents of the code from the scanned test page.

This may include reviewing the scanned test page for the QR code and then reading the QR code. The client computing device may have software stored within memory that, when executed by a processing device, is capable of identifying a region of an image that contains QR code. Scanning the test page for the QR code may include identifying the position boxes at the edge of the QR code within an image file that represents the scanned test page.

The QR code, itself, may correspond to a string of characters. This string of characters may be a web address or a password, in some embodiments. Once the QR code is identified within the page by the software, the software may analyze the light and dark regions within the QR code to extract the corresponding string of characters that represent the contents of the code.

Once the contents of the code are extracted from the scanned test page by the client computing device, the client computing device may transmit the code to the managing server. In some embodiments, the managing server will verify the code received from the client computing device against the code initially transmitted to the client computing device in the test print image data.

If these two codes match one another, the managing server may confirm that the image forming apparatus is functioning as intended. Therefore, the managing server may transmit an approval notification to the client computing device. Additionally, the managing server may enroll the image forming apparatus into its database.

Furthermore, this method may be used to service or perform maintenance on image forming apparatuses that were previously enrolled in the managing server. This method allows for the verification of an image forming apparatus that is located remotely from a managing server.

II. Example Systems

FIG. 1 is an illustration of an image forming system 100, according to example embodiments. The system 100 includes an image forming apparatus 102, a client computing device 104, and a managing server 106.

Figure 2:
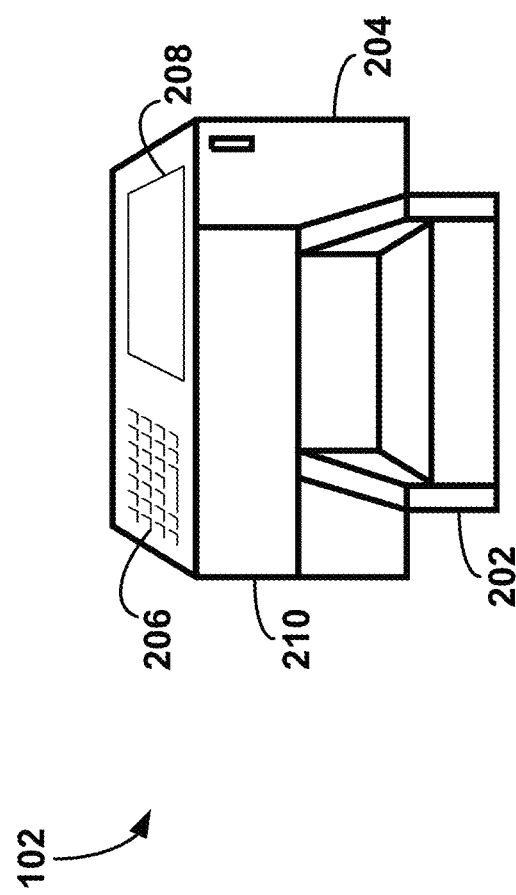
FIG. 2 depicts an image forming apparatus, according to example embodiments.

The image forming apparatus 102 is further detailed in FIG. 2, and may be a printing device or an MFP capable of performing multiple image forming tasks, in addition to printing.

The client computing device 104 may be a desktop computing device, a laptop computing device, a tablet computing device, or a mobile computing device in various embodiments.

The client computing device 104 may have a component for digitally recording copies of physical entities. For example, if the client computing device 104 is a mobile computing device, it may come equipped with a digital camera that allows recording digital images on a non-volatile memory within the client computing device 104. Alternatively, if the client computing device 104 is a desktop computing device, it may contain a scanning unit capable of capturing the image of a two-dimensional (2D) paper into digital form.

Further, if the client computing device 104 is a mobile computing device or a tablet computing device, it may have mobile applications (apps) stored within a memory in the client computing device 104. Communication between the client computing device 104 and the image forming apparatus 102 or between the client computing device 104 and the managing server 106 may be routed/hosted by a specific app.

Additionally, such an app could store data, in volatile or non-volatile memory, regarding the settings of the validation process, configuration settings, images taken of test pages, listings of previously validated image forming apparatuses, etc. (further described with regard to FIG. 6).

In some embodiments, the configuration settings stored by the app may include printing settings for the image forming apparatus 102. The printing settings may have been originally transmitted by the managing server 106 for the purpose of test page printing, and may be sent from the client computing device 104 to the image forming apparatus 102 along with a test page print request. The printing settings may correspond to respective document types associated with the test print data, e.g., a grayscale printing setting may be associated with a test page that only contains text whereas a color printing setting may be associated with a test page containing an artistic image.

The configuration settings may also include scanning settings transmitted by the managing server 106, such as scanning resolution, output document type (png, jpeg, tif, bmp, pdf, etc.), and output save location. These settings may be used by the client computing device 104 or the image forming apparatus 102 to scan a printed test page.

Furthermore, the configuration settings may change during the verification process. If, for example, the code scanned from the printed test page and submitted to the managing server 106 is illegible, the test page may be reprinted. Alternatively, or additionally, a rescanning of the code from the printed test page may occur. This reprinting and/or rescanning may occur using modified configuration settings. Such modified configuration settings may aid in a determination of what caused the initial verification failure. For instance, if the scanned code submitted to the managing server 106 is unable to be read, the managing server 106 may transmit a message to the client computing device 104 indicating that the scanning resolution within the configuration settings be increased. Upon increasing the scanning resolution within the client computing device 104, rescanning the code, and resubmitting the code to the managing server 106, the code can now be clearly read and verified by the managing server 106. This would indicate to both the client computing device 104 and the managing server 106 that the initially lower scanning resolution was likely the reason the code was unable to be read.

The managing server 106 validates the image forming apparatus 102. Within the managing server 106 are one or more codes that can be embedded in an image and transmitted to the image forming apparatus 102 for printing.

Also, the managing server 106 is configured to validate codes that it transmits embedded within images against codes that it receives from the client computing device 104. This could be done using a general purpose processing unit, for example.

In addition, the managing server 106 may maintain a list of all approved image forming apparatuses for use by client computing devices 104 that are enrolled in the managing server's 106 network.

FIG. 2 depicts an example image forming apparatus 102. The image forming apparatus 102 may be configured to print partially-stored and/or fully-stored electronic documents on various types of physical output media (i.e., the image forming apparatus 102 may be configured to print document incrementally, as they are received by the image forming apparatus 102, or documents that have been fully received by the image forming apparatus 102). These output media include, but are not limited to, various sizes and types of paper, overhead transparencies, three-dimensional (3D) plastics, and so on. The image forming apparatus 102 may be interchangeably referred to as a "printer."

The image forming apparatus 102 may serve as a local peripheral to the client computing device 104, such as a personal computer, a server device, a print server, etc. In these cases, the image forming apparatus 102 may be attached to the client computing device 104 by cable, such as a serial port cable, parallel port cable, Universal Serial Bus (USB) cable, FireWire® (IEEE 1394) cable, or High-Definition Multimedia Interface (HDMI) cable. Thus, the client computing device 104 may serve as a source of electronic documents for the image forming apparatus 102.

On the other hand, the image forming apparatus 102 may include a wireline or wireless network interface, such as an Ethernet or Wi-Fi® (IEEE 802.11 standards) interface. So arranged, the image forming apparatus 102 may serve as a printing device for any number of computing devices that can communicate with the image forming apparatus 102 over a network. In some embodiments, the image forming apparatus 102 may serve as both a local peripheral and a networked printer at the same time.

In order to use the image forming apparatus 102, computing devices may install one or more printer drivers. These printer drivers may include software components that convert the electronic documents to be printed from various local representations stored on the computing devices to one or more representations supported by the image forming apparatus 102.

Regardless, the image forming apparatus 102 may comprise a computing device, and may carry out both printing-related and non-printing related tasks. For instance, the image forming apparatus 102 may also include copier, fax, and scanner functions. In some embodiments, the image forming apparatus 102 may use a scanning element to facilitate copier and/or fax functions. For instance, the image forming apparatus 102 may scan a physical document into an electronic format, and then print the resulting electronic document to provide a copy, and/or transmit the resulting electronic document via a telephone interface to provide a fax operation. Additionally, the image forming apparatus 102 may be able to receive a faxed electronic document via a telephone interface, and then compress and store a representation of this electronic document.

In order to support its various capabilities, the image forming apparatus 102 may include a document feeder/output tray 202, paper storage 204, a user interface 206, a scanning element 208, and a chassis 210. It should be understood that image forming apparatuses may take on a wide variety of forms. Therefore, the image forming apparatus 102 may include more or fewer components than depicted in FIG. 2, and/or components arranged in a different fashion than depicted in FIG. 2.

The document feeder/output tray 202 may hold physical documents (e.g., a stack of one or more sheets of paper) that are to be scanned, copied, or faxed. Advantageously, the document feeder/output tray 202 may allow the image forming apparatus 102 to automatically feed multiple physical documents for processing by the image forming apparatus 102 without requiring manual intervention. The document feeder/output tray 202 may also include one or more separate output trays for holding physical documents that have been processed by the image forming apparatus 102. These may include physical documents that have been scanned, copied, or faxed by the image forming apparatus 102, as well as physical documents that have been produced by, e.g., the fax and/or copying functions of the image forming apparatus 102.

Paper storage 204 may include trays and/or feeding elements for various types of physical media. For instance, paper storage 204 may include separate trays for 8.5×11 inch paper, A4 paper, letterhead paper, envelopes, and so on. For any operation of the image forming apparatus 102 that involves outputting physical media (e.g., printing, copying, and/or receiving a fax), paper storage 204 may supply the physical media. In embodiments where the printing devices 104, 106, 108 are capable of 3D printing, the paper storage 204 may supply the physical media in the form of acrylic (polymethyl methacrylate—PMMA), acrylonitrile butadiene styrene (ABS), or polylactic acid (PLA), for example.

The user interface 206 may facilitate the interaction of the image forming apparatus 102 with a human or non-human user, such as to receive input from a user and to provide output to the user. Thus, the user interface 206 may include input components such as a keypad, keyboard, touch-sensitive or presence-sensitive panel, joystick, microphone, still camera, and/or video camera. The user interface 206 may also include one or more output components such as a display screen (which, for example, may be combined with a presence-sensitive panel), a cathode ray tube (CRT), a liquid crystal display (LCD), a light emitting diode (LED) based display, a display using digital light processing (DLP®) technology, a light bulb, and/or one or more other similar devices, now known or later developed. The user interface 206 may also be configured to be able to generate audible output(s), via a speaker, speaker jack, audio output port, audio output device, earphones, and/or other similar devices, now known or later developed in the future.

The scanning element 208 may be a glass panel below which a movable light source operates to scan physical media placed on top of the glass panel. Alternatively, a digital camera below the glass panel may "scan" the physical media placed on top of the glass panel by taking a picture of the physical media. Images of scanned physical media may be stored in data storage associated with the image forming apparatus 102.

The chassis 210 may include a physical housing that contains and/or interconnects various components of the image forming apparatus 102, such as the document feeder/output tray 202, paper storage 204, the user interface 206, and the scanning element 208. Additionally, the chassis 210 may house other components not shown in FIG. 2. For example, the chassis 210 may contain one or more toner cartridges, liquid ink jets, belts, rollers, and/or power supplies. Further, the chassis 210 may include communication interfaces, such as wireline and/or wireless network interfaces, a telephony interface (e.g., an RJ45 jack), a USB interface, a Bluetooth® interface, a card reader port, etc.

Figure 3:
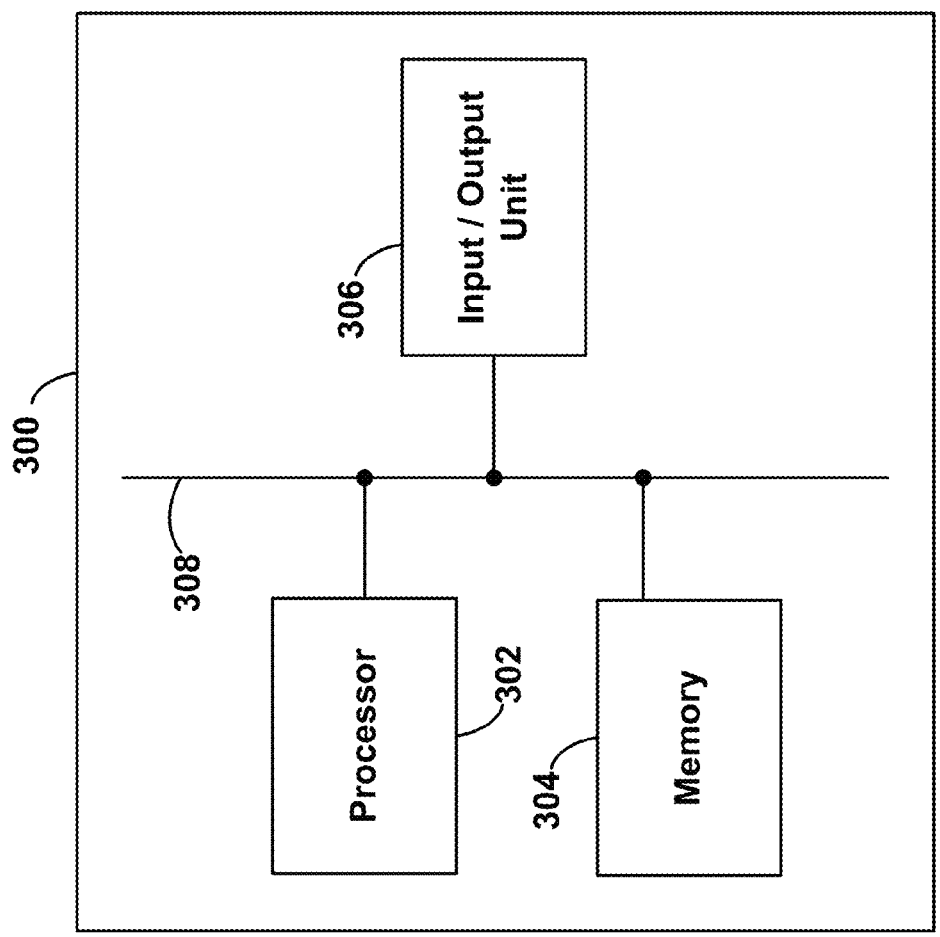
FIG. 3 is a schematic block diagram illustrating computing components of an image forming apparatus, a client computing device, or a managing server, according to example embodiments.

Moreover, as the image forming apparatus 102 may be based on general-purpose and/or specially-designed computing device components, the chassis 210 may also house some or all of these components. To that point, FIG. 3 depicts an example embodiment 300 of computing device components (e.g., functional elements of a computing device) that may be included in the image forming apparatus 102, the client computing device 104, or the managing server 106.

Computing device components 300 may include a processor 302, memory 304, and an input/output unit 306, all of which may be coupled by a system bus 308 or a similar mechanism. The processor 302 may include one or more central processing units (CPUs), such as one or more general purpose processors and/or one or more dedicated processors (e.g., application specific integrated circuits (ASICs) or digital signal processors (DSPs), etc.).

Memory 304, in turn, may comprise volatile and/or non-volatile data storage and can be integrated in whole or in part with the processor 302. Memory 304 may store program instructions, executable by the processor 302, and data that are manipulated by these instructions to carry out the various methods, processes, or functions described herein. Alternatively, these methods, processes, or operations can be defined by hardware, firmware, and/or any combination of hardware, firmware, and software. Therefore, memory 304 may include a tangible, non-transitory, computer-readable medium, having stored thereon program instructions that, upon execution by one or more processors 302, cause the respective devices to carry out any of the methods, processes, or functions disclosed in this specification or the accompanying drawings.

Memory 304 may also be configured to store compressed and non-compressed electronic documents that may later be processed (e.g., printed or faxed), such as a document that represents a print job that is received by the image forming apparatus 102 and designates a future time for completion. Thus, memory 304 may serve as an output medium for these electronic documents.

The input/output unit 306 may include any of the operations and/or elements described in reference to the user interface 206. Thus, the input/output unit 306 may serve to configure and/or control the operation of the processor 302. The input/output unit 306 may also provide output based on the operations performed by the processor 302.

These examples are provided for illustrative purposes. In addition to and/or alternatively to the examples above, other combinations and/or sub-combinations of printer and computer technologies may also exist, among other possibilities, without departing from the scope of the embodiments herein.

III. Example Processes

Throughout the remainder of the specification, terms such as "validation", "verification", and "authentication" may be used to describe the processes performed by the client computing device 104 and the managing server 106 to monitor the image forming apparatus 102. It will be apparent that these terms can be taken to mean, but are not limited to, such activities as performing maintenance on the image forming apparatus 102, verifying the image forming apparatus 102 is functioning properly, validating that the print data provided to the image forming apparatus 102 can be properly reproduced, and authenticating the image forming apparatus 102 such that it may be relied upon for future processing of printing jobs.

Figure 4:
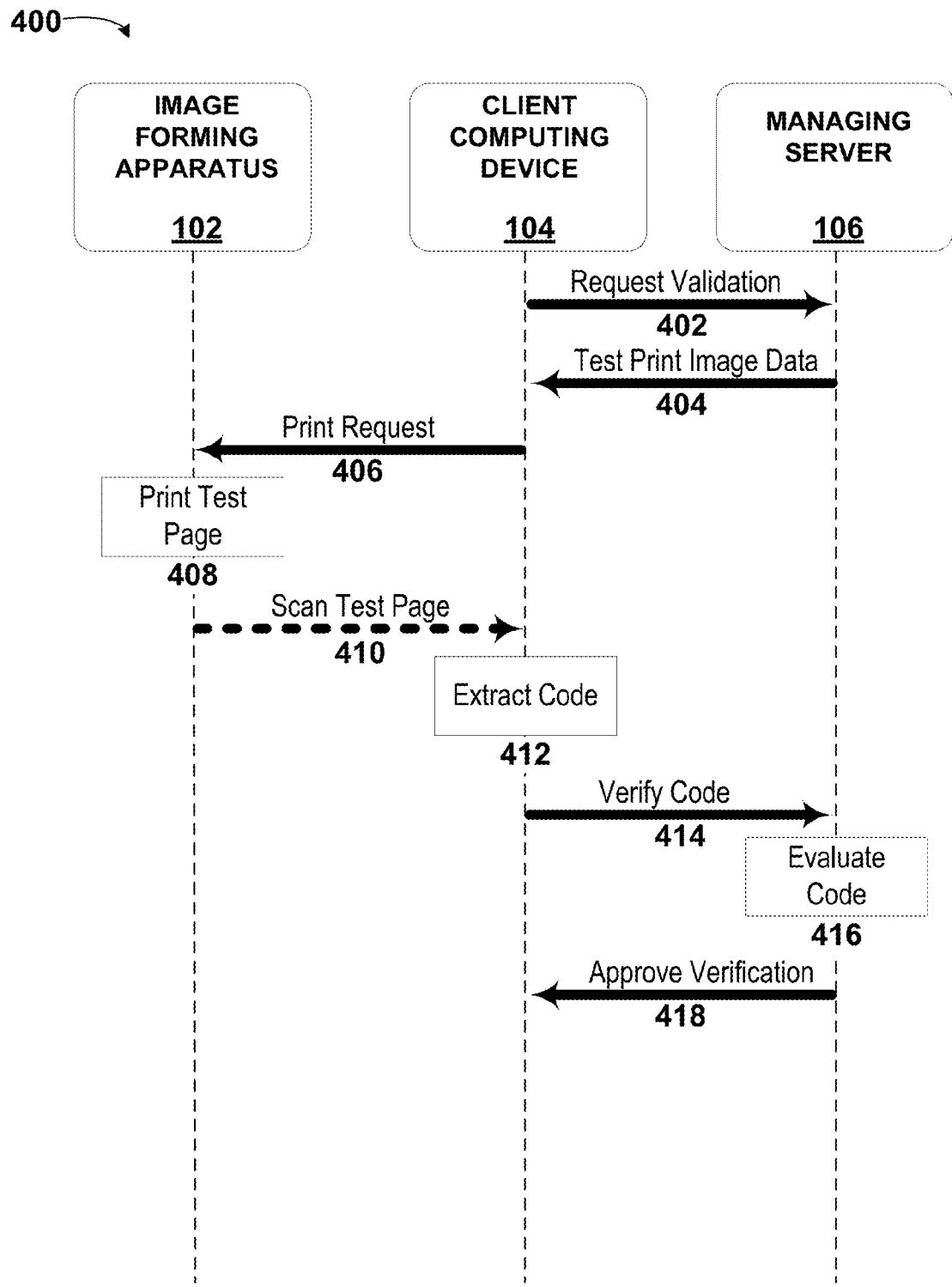
FIG. 4 is a data flow diagram illustrating a method, according to example embodiments.

FIG. 4 is a data flow diagram illustrating an image forming apparatus verification method 400, according to example embodiments. The method is carried by the image forming apparatus 102, the client computing device 104, and the managing server 106.

At step 402, the method 400 includes the client computing device 104 transmitting a request to the managing server 106 to initiate the validation process. In some embodiments, this may include submitting form data through a web browser to the managing server 106. Alternately, the request of step 402 may be submitted via an app, particularly if the client computing device 104 is a mobile computing device.

Step 402 may be initiated through a user interacting with an input device on the client computing device 104. This interaction may be prompted by the client computing device 104 in response to a new image forming apparatus being installed within a network. The client computing device 104 may be alerted of the new image forming apparatus joining the network through an update received from the new image forming apparatus.

The validation request of step 402 may be accompanied with additional information about the image forming apparatus 102, such as make, model, serial number, physical location, network address and image processing capabilities. This additional information may be stored within the managing server 106 and accessible by other members of the network.

Furthermore, if specific information about the validation must be indicated by the client computing device 104 to the managing server 106, it can be done during step 402. For instance, if the client computing device 104 is not capable of processing QR codes, but is capable of processing barcodes, it may be the case that the client computing device includes within the request to initiate validation of step 402 that the test print image data contain only barcodes.

At step 404, the method 400 includes the managing server 106 transmitting the test print image data to the client computing device 404. The test print image data contains information, for transmission to the image forming apparatus 102, by which the managing server 106 can validate the image forming apparatus 102.

This data contains, in some embodiments, a code used to confirm that the image forming apparatus 102 is functioning correctly. This code may be alphanumeric, and contained within printable data (e.g., optical character recognition data—OCR data, a barcode, or a QR code).

At step 406, the method 400 includes the client computing device sending a print request of the test print image data to the image forming apparatus 102. Step 406 may include, in some embodiments, the client computing device 104 converting the test print image data sent from the managing server 106 in step 404 into a different form, such as a print job. For example, the client computing device 104 may have a printer driver installed that can convert test print image data from a form such as a portable document format (PDF) to a form consumable by the image forming apparatus 102.

In other embodiments, the print request sent in step 406 includes the client computing device 104 transmitting the test print image data from step 404 to the image forming apparatus 102 in addition to a request to print the test print image data.

At step 408, the method 400 includes the image forming apparatus 102 printing the test page. In some embodiments, the data to be printed that was included with the print request 406 will need to be converted by the image forming apparatus 102 prior to printing. This may include separating a print job into printable data and metadata, and selecting the printable data for processing.

Step 408 may include transferring a form of the data communicated in the print request 406 to a physical medium, i.e., printing the data. The printing executed in step 408 may be performed using various printing techniques. Various embodiments may use laser printing, dot matrix printing, inkjet printing, or 3D printing, for example. The page or object printed in step 408 should contain the code transmitted by the managing server 106 in step 404 and communicated in the print request of step 406 by the client computing device 104.

At step 410, the method 400 includes the client computing device 104 scanning the printed test page. Step 410 may include recording a digital image using a digital camera built-in to the client computing device 104 and storing the digital image within a non-transitory, computer-readable medium within the client computing device 104.

Alternatively, step 410 may include placing a printed page onto a scanning device connected to or built within the client computing device 104 and then scanning the image into a digital format (PDF or portable network graphics—PNG, for instance). This digital format may then be stored within memory in the client computing device 104.

As an additional alternative, step 410 may include placing the printed test page onto the scanning element 208 within the image forming apparatus 102 and then scanning the image into a digital format. This digital format may then be transmitted to the client computing device 104 by the image forming apparatus 102 for further processing.

The scanning of step 410 may include scanning the entire test page/test object. In some embodiments, though, only a portion of the test page/test object that includes the code may be scanned/retained by the client computing device 104.

The scanning of step 410 may be guided by an app, in some embodiments. In other embodiments, such as when the client computing device 104 is a desktop computing device, step 410 may occur using an auxiliary software for scanning images and storing them within non-volatile memory in the client computing device 104.

At step 412, the method 400 includes the client computing device 104 extracting the code from the printed test page. This may include one or multiple image manipulation/analysis techniques, such as rendering to monochrome or grayscale, increasing or removing saturation, modifying brightness, modifying white-balance, etc. in order to make the code legible by the client computing device 104.

For example, if the code from the printed test page cannot be identified and/or read by the client computing device 104, the client computing device 104 may apply one of the above listed image manipulation techniques to attempt to improve the image. If the client computing device 104 still cannot identify and/or read the code, another image manipulation technique may be applied. These steps of trying to identify and/or read the code by the client computing device 104 and then applying an image manipulation technique may be repeated multiple times in step 412. This may occur until the code is legible or until a predetermined number of image manipulations has occurred, indicating that future attempts of the client computing device 104 to read the code are unwarranted, and the code reading process has timed out. The predetermined number of manipulations before timeout occurs may be configurable.

Step 412 may include the use of one or more OCR algorithms to extract code data from the scanned test page. Alternatively, step 412 may include a reading of the barcode/QR code data from within the scanned test page data of step 410. The code may be a string of characters corresponding to the image information contained within the printed test page.

In some embodiments the code may contain information for accessing the managing server 106. For example, the string of characters represented by the code may be a password that the client computing device 104 needs to provide to the managing server 106 in order to log into the managing server 106 to complete the verification process.

At step 414, the method 400 includes the client computing device 104 transmitting the extracted code to the managing server 106 for verification. For example, the client computing device 104 may transmit the string of characters corresponding to the printed test page from step 412.

This communication may occur through the use of an app executed by the client computing device 104 that communicates with the managing server 106. Alternate mechanisms for transferring the extracted code to the managing server 106 are also possible, such as the client computing device 104 transmitting an email, the client computing device 104 submitting a web form over the public Internet, the client computing device 104 transmitting wirelessly over Bluetooth®, the client computing device 104 transmitting locally through a router that serves a local area network (LAN), or the client computing device 104 transmitting locally through a direct wireline connection between the client computing device 104 and the managing server 106, such as a USB cable.

At step 416, the method 400 includes the managing server 106 evaluating the transmitted, extracted code for consistency with the code that was transmitted with the test print image data. This may involve checking, character-by-character, a string transmitted from the client computing device in step 104 with a string stored within non-volatile memory in the managing server 106 that corresponds to the code transmitted with the test print image data in step 404.

Step 416 may further include separating the code portion from the rest of the message transmitted by the client computing device 104 in step 414. This may include removing header information, such as destination, from the message.

If the code is successfully verified, step 416 may further include generating an approval message for transmission to the client computing device 104.

Furthermore, if the code was successfully verified, step 416 may include adding the image forming apparatus 102 to a list of approved image forming apparatuses within the managing server 106. This list may be a file stored within the non-volatile memory of the managing server 106 that contains image forming apparatuses within the network that are approved for the processing of image forming requests from client computing devices. Additionally, this list may contain metadata regarding each image forming apparatus within the network that is approved, such as make, model, location, image forming capabilities, etc. In some embodiments, this list may be accessible by all client computing devices to determine available image forming apparatuses for image forming requests.

At step 418, the method 400 includes the managing server 106 transmitting an approval notification to the client computing device 104. This approval notification may further indicate to the client computing device 104 that the image forming apparatus 102 has been enrolled in the server as an approved image forming apparatus.

In addition, the approval notification may include metadata regarding the validation process, such as how long it took, the difficulty of the code assigned, the length of time the image forming apparatus 102 will remain validated within the managing server 106, etc.

Figure 5:
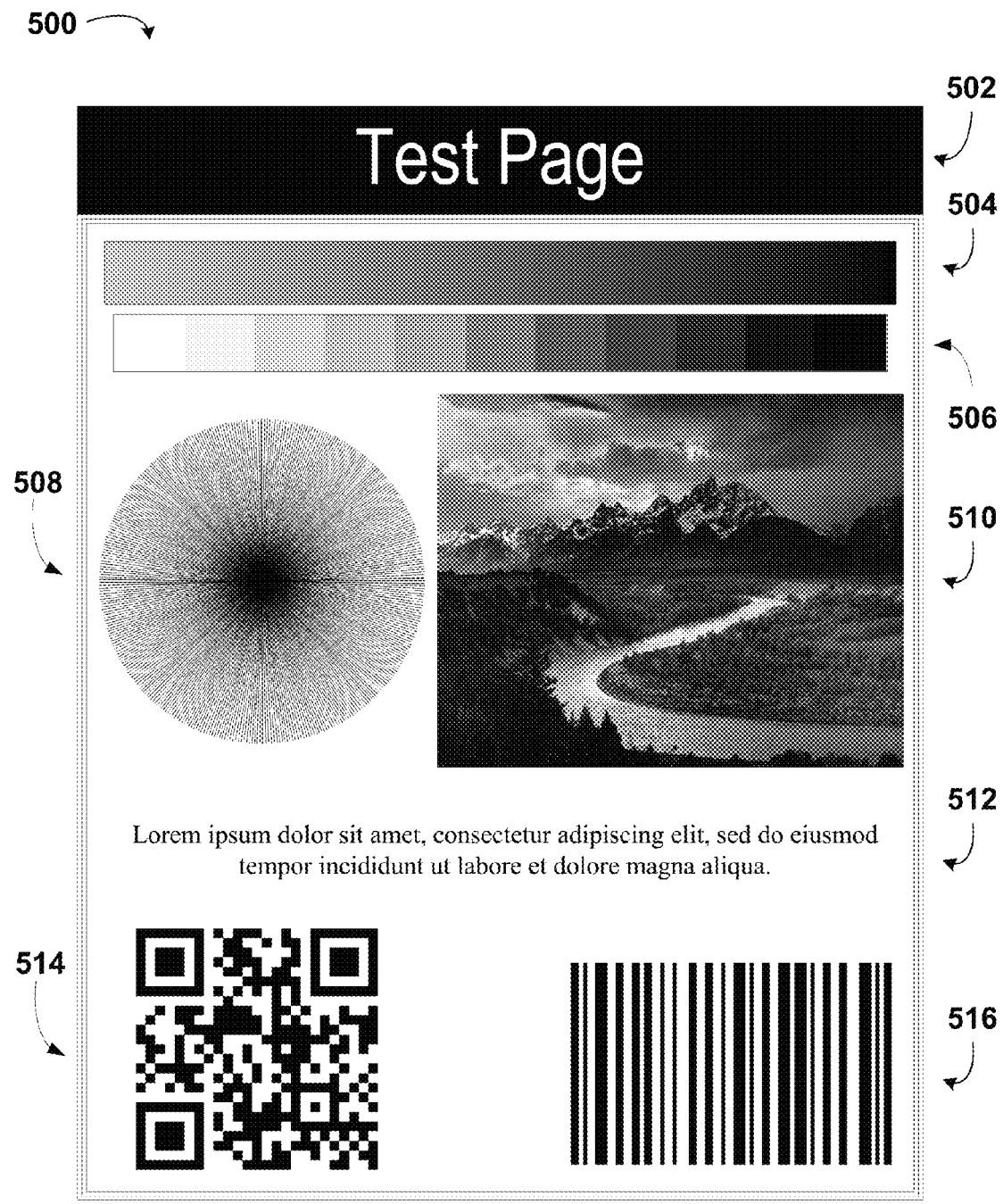
FIG. 5 is an illustration of a test page, according to example embodiments.

FIG. 5 is an illustration of a test page 500, according to example embodiments. This test page 500 may be the result of step 408 of method 400. Likewise, it could be a visual representation of the test print data transmitted by the managing server 106 in step 404 of method 400 or the test page print request transmitted by the client computing device 104 in step 406 of method 400.

The test page 500 may include a title 502, a continuous toner test bar 504, a discrete toner test bar 506, a set of radial lines separated by one-degree each 508, a visual image 510, text for OCR analysis 512, a QR code 514, and a barcode 516. In various embodiments the test page may contain more, fewer, or different elements. The test page 500 is a tool used for verifying certain functionalities of the image forming apparatus 102.

The test page 500 may vary when generated by various managing servers 106, or when printed by various image forming apparatuses 102. It may also be the case, in some embodiments, that a printer driver associated with the test page 500 formats the layout of the test page 500, as opposed to the client computing device 104 or the managing server 106.

The title 502 indicates to the client computing device 104 or a user of the client computing device 104 the nature of the test page 500. It helps differentiate the test page 500 from other pages that may be printed by the image forming apparatus 102.

The continuous toner test bar 504 displays a specific toner printed with 0% intensity up to 100% intensity, varied continuously in between. This may be done, in some embodiments, for the black toner. Additionally, this could be done for the cyan, magenta, and yellow (CMY) toners, individually, in alternate embodiments. This may indicate which subset of toner colors are depleted. Furthermore, the red, green, and blue (RGB) toner set could be used. For embodiments using multiple color toners, multiple continuous toner test bars 504 may be included on the test page 500.

The continuous toner test bar 504 can also serve as a means of displaying toner application resolution, i.e., how discretely the toner can be applied. It may be the case in some embodiments that the toner nozzle which controls how much toner is applied to the printed paper in any one location can only vary by discrete percentages, such as 2%, 4%, 6%, etc. By printing the continuous toner test bar 504 on a printed test page, and analyzing it, the toner application resolution of the image forming apparatus 102 can be determined.

The discrete toner test bar 506 displays how a specific toner looks when printed with 0% intensity up to 100% intensity, similar to the continuous toner test bar 504. Also similar to the continuous toner test bar 504, the discrete toner test bar 506 may, in some embodiments, be printed separately for different colored toners (CMY or RGB). Unlike the continuous toner test bar 504, though, the discrete toner test bar 506 is varied in discrete increments, e.g., 0%, 10%, 20%, 30%, etc.

The set of radial lines separated by one-degree each 508 serves as a metric of the spatial resolution of an image forming apparatus. If the individual lines can only be resolved at a specific radial distance from the center of the circle (one inch, for example), the minimum resolution distance can be determined using arc-length. This may provide information about the image forming apparatus such as the clarity of the toner heads, the incremental distances the printer belt moves between width scans of the test page 500, and the maximum resolution of the reader contained within the printer driver software. Again, in some embodiments, the set of radial lines separated by one-degree each 508 may be provided for each of many colored toners.

Further, the set of radial lines separated by one-degree each 508 may serve as a mechanism for identifying unintended distortion in the client computing device 104, e.g., a smudged or curved lens on a camera component of the client computing device 104. Because the set of radial lines separated by one-degree each 508 are identifiable by the client computing device 104 and it is well-defined how the lines should appear, the client computing device 104 can perform a self-analysis on its scanning mechanisms using the radial lines 508 printed on the test page 500. Furthermore, if a distortion pattern is discovered within an image of the test page 500 obtained by the client computing device 104, it can be accounted for/corrected using software within the client computing device 104, prior to transmission to the managing server 106. Such a correction will prevent some false negatives from arising in the verification process, thereby more accurately representing the state of the image forming apparatus 102.

The visual image 510 allows for a user of the image forming apparatus 102 to identify deficiencies that may be present within the apparatus. Familiar pictures, such as landscapes, famous buildings, faces, pieces of art, etc. may be used, as they are easily identifiable by users, and users, therefore, can identify any inaccuracies.

Alternatively, the visual image 510 may, in some embodiments, correspond to an image stored within the memory 304 of the client computing device 104. This may allow the client computing device 104 to perform a pixel by pixel comparison between the test page 500 and the image stored within the memory 304, which could alert the client computing device 104 of minute discrepancies between the transmitted print job and the test page 500 that would not otherwise be noticeable from the test page 500.

The visual image 510 may further contain colors that would not be otherwise contained in the test page 500. This may aid in analyzing the toner mixing qualities of the image forming apparatus 102. For instance, in some embodiments, it may be the case that the cyan, magenta, yellow, and black (key) toner dispensing members in the image forming apparatus 102 all function adequately individually, but when mixing 2 primary toner colors to form a different toner color, the toner is dispensed in incorrect proportions, thereby yielding the incorrect hue of a certain color, or the incorrect color entirely. Particularly if the visual image 510 is one whose intended colors are well established, the visual image 510 would allow for identification of this potential error.

The text for OCR analysis 512 may serve multiple purposes. As with the visual image 510, the phrase or sentence contained in the text for OCR analysis 512 may be recognizable by users, allowing for identification of inaccuracies which may point to specific deficiencies within the image forming apparatus 102. Further, however, this text may contain the code transmitted in the test page print request from the client computing device 104 to the image forming apparatus 102 and transmitted in the test print image data from the managing server 106 to the client computing device 104.

If the text for OCR analysis 512 contains the code, it may be represented as a string of characters contained within the text. Alternatively, it may be represented differently, such as the third character of each line, the translation of the fourteenth word in the text to a different language, or other even more intricate codes in various embodiments. Regardless of what the code is, it may be a code that can be scanned by the client computing device 104 and transmitted to the managing server 106 for validation.

The QR code 514 may additionally serve as a mechanism by which the test page 502 displays the code to the client computing device 104. The code may be read using a software that performs image analysis on a picture taken by a digital camera on a mobile computing device, in some embodiments. The QR code 514 may correspond to a string of characters, a particular number, or a web address, in various embodiments. These corresponding pieces of data are transmitted from the client computing device 104 to the managing server 106 for verification.

Additionally, the QR code 514 may be printed using multiple colors. For example, the left third of the QR code may be printed using cyan toner, the middle third using magenta toner, and the right third using yellow toner. Therefore, if, for instance, the cyan toner was empty, a portion of the code would not print correctly on the test page 500. If a portion of the code did not print correctly, the managing server 106 may then disapprove of the image forming apparatus 102 based on the incorrect code scanned and transmitted from the client computing device 104.

In other embodiments, the various colors may be strategically placed such that the code would be changed if one of the toner colors were empty. Again, for example, if the cyan toner were empty, the code scanned and transmitted from the client computing device 104 to the managing server 106 may indicate to the managing server 106 the status of the image forming apparatus 102 (i.e. that the cyan toner cartridge needs to be replaced). The managing server 106 may then indicate to the client computing device 104 that, prior to verifying the image forming apparatus 102, the cyan toner cartridge must be replaced. The client computing device 104 may then act to rectify the problem.

The barcode 516 may additionally serve as a mechanism by which the test page 500 displays the code information to the client computing device 104 (barcodes are a one-dimensional analog of QR codes). As with the QR code 514, the barcode 516 may represent a string of characters, a number, or a web address. This may then be scanned and transmitted to the managing server 106 by the client computing device 104 for validation of the image forming apparatus 102.

Many of the elements above may be combined into singular features on the test page 500, in various embodiments. For example, the barcode 516 may comprise multiple continuous toner test bars 504. The continuous toner test bars 504 could replace the bars in the barcode 516. Furthermore, the continuous toner test bars 504 structured in this fashion may alternate among various colors, such as from cyan to magenta to yellow to black (CMYK), for instance. This would provide the client computing device 104 with multiple pieces of information in one feature on the test page 500.

Figure 6:
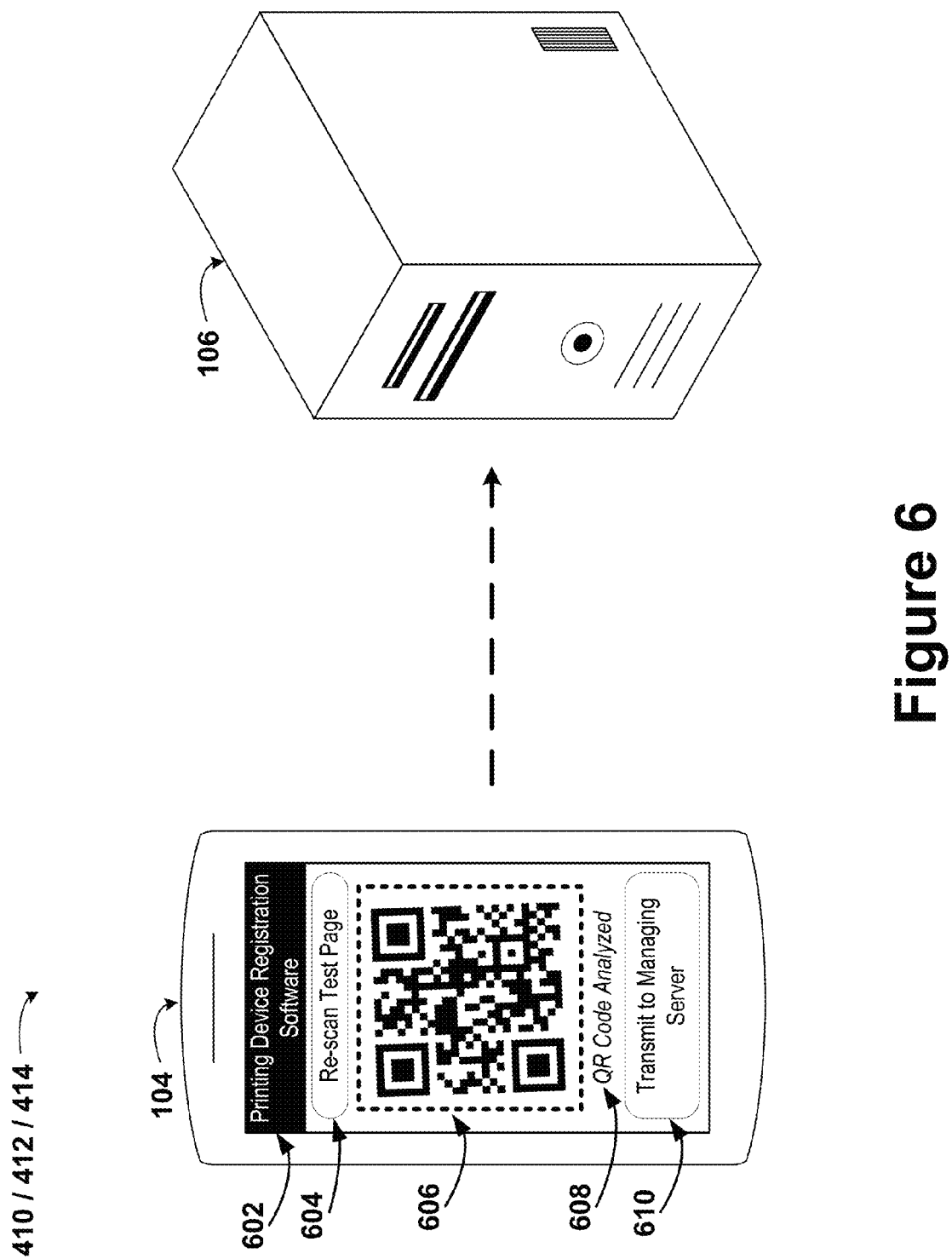
FIG. 6 is an illustration of a client computing device and a managing server executing steps of the method illustrated in FIG. 4, according to example embodiments.

FIG. 6 is an illustration of the client computing device 104 and the managing server 106 executing steps 410, 412, and 414 of method 400, for example. The client computing device 104 may be executing an app to accomplish some or all of the steps of method 400, in some embodiments. The app may include an application title 602, a test page scan button 604, a code analysis section 606, a status indicator 608, and a transmit button 610.

The action of scanning the test page 500 may be initiated by engaging the test page scan button 604. Upon scanning the test page 500 (step 410 of method 400), either using a scanning device, a camera, or some other mechanism, the client computing device 104 will identify the location of the scanned test page that contains the code. Before identifying the code, the app may change the appearance of the test page scan button 604 to indicate a scan has already taken place (e.g., change the overlaid text from "Scan Test Page" to "Re-scan Test Page").

Depending on how the scan was performed (e.g., using a digital camera on a mobile computing device vs. using a local scanner connected to a desktop computing device), the portion of the scanned test page that contains the code could be the entire scanned image or just a portion of it. Once the client computing device 104 has identified the location of the code, it will attempt to extract it (step 412 of method 400). During the extraction process, the app on the client computing device 104 may indicate in the code analysis section 606 which portion of the scanned image is being analyzed. This allows a user to visually confirm that the portion being scanned is the portion of the test page 500 that contains the code.

Depending on the embodiment, the code could be analyzed using image processing techniques applied to any or a combination of the following: QR codes, barcodes, or OCR data.

Upon identification of the code by the client computing device 104, the status indicator 608 may be updated to display that the code has been analyzed. Furthermore, the status indicator 608 may be updated during any of the following activities: the execution of the scan, the code analysis being performed, the transmission of the code to the managing server 106, and the completion of the transmission of the code to the managing server 106.

Additionally, not shown in FIG. 6, the app may indicate when the client computing device 104 receives a confirmation from the managing server 106 that the image forming apparatus 102 was successfully verified. In addition, in some embodiments, it may be possible for the client computing device 104 to list all of the image forming apparatuses that have been verified by the managing server 106, or a subset of those that have been verified by the managing server 106, such as those image forming apparatuses that are within a 1 mile distance of the client computing device 104.

The application title 602 indicates to a user of the client computing device 104 which app is currently being executed by the client computing device 104. In some embodiments, the application title 602 may also indicate the name of the image forming apparatus 102 that is currently being evaluated, to prevent wrongful association of a printed test page 500 or its code with a different image forming apparatus.

The test page scan button 604 is engaged in order to scan the printed test page 500 for code content. Pressing this button may, in some embodiment, include recording a picture with a digital camera. This may be a picture of the entire printed test page 500, and then the app extracts the portion which contains the code data (e.g., the QR code). Alternatively, the picture recorded by the digital camera may be a section of the test page 500 that is manually selected using the location of the digital camera.

In other embodiments, the test page scan button 604 may initiate a scanning action by a scanning device. This may occur, for example, when the client computing device 104 is a desktop computing device using a local image forming apparatus equipped with a scanning element as its image capture element.

In addition, the test page scan button 604 may, once engaged, change configuration. For example, once the printed test page 500 has been initially scanned, the test page scan button 604 may change its overlaid text from "Scan Test Page" to "Re-scan Test Page" or from "Take Code Image" to "Retake Code Image". This would display that the image has already been captured, and should only be recaptured if it doesn't appear correctly in the code analysis section 606. Re-engaging the test page scan button 604 may initiate a rescanning action by the client computing device 104.

The code analysis section 606 may display the captured code section of the image. This may allow a user to quickly identify whether the printed test page 500 is being accurately reflected in the captured image. If the printed test page 500 is not being accurately reflected, it could inform the user of a problem within the way the image was captured, or with the client computing device 104, itself.

The status indicator 608 may indicate the last action taken on the client computing device 104, such as receiving a user's engagement of the test page scan button 604 or completion of the analysis of a QR code contained within the printed test page 500.

The transmit button 610 may be engaged to transmit the code extracted from the printed test page 500 to the managing server 106. The transmit button 610 may not be able to be engaged unless the test page scan button 604 has been previously engaged and the code contained within the printed test page 500 has been sufficiently analyzed, in certain embodiments.

Figure 7:
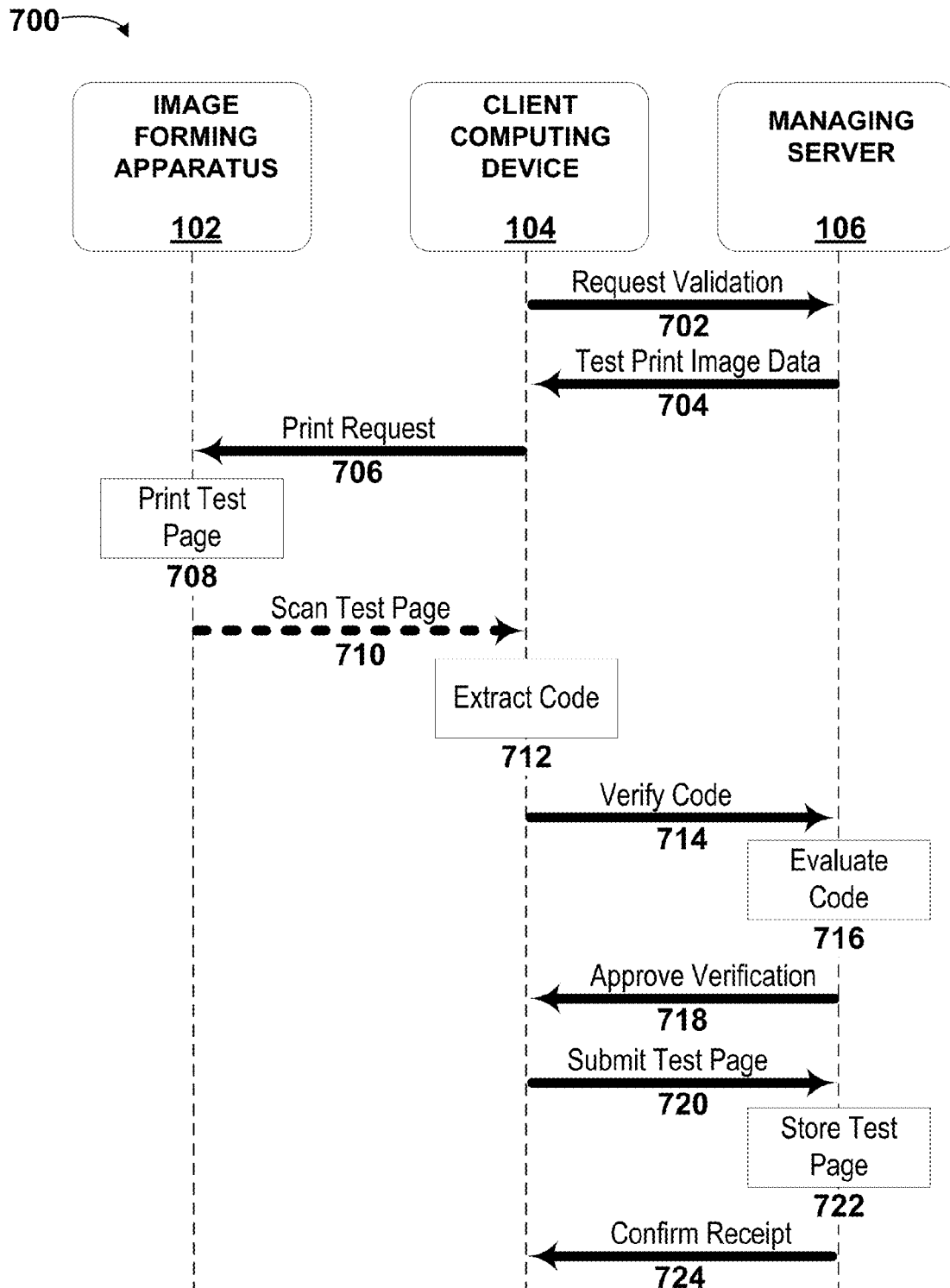
FIG. 7 is a data flow diagram illustrating another method, according to example embodiments.

FIG. 7 is a data flow diagram illustrating another image forming apparatus verification method 700, according to example embodiments. The method is carried out by the image forming apparatus 102, the client computing device 104, and the managing server 106.

Steps 702, 704, 706, 708, 710, 712, 714, 716, and 718 are analogous to steps 402, 404, 406, 408, 410, 412, 414, 416, and 418 of method 400, respectively. Please see the detailed description of method 400 for further details regarding these steps.

At step 720, the method 700 includes the client computing device 104 transmitting the entire test page to the managing server 106. The test page may be in the form of a PDF file, a Joint Photographic Experts Group (JPEG) file, or a PNG file, as examples. This test page may be transmitted over the internet using secure file transfer protocol (SFTP).

At step 722, the method 700 includes the managing server 106 storing the test page for later retrieval. This may include, in some embodiments, the managing server 106 converting the test page from one format to another and/or compressing the test page for easier storage. It may also include the managing server 106 storing the test page in a section of non-volatile memory within the managing server 106.

At step 724, the method 700 includes the managing server 106 transmitting a message confirming receipt of the test page to the client computing device 104.

Figure 8:
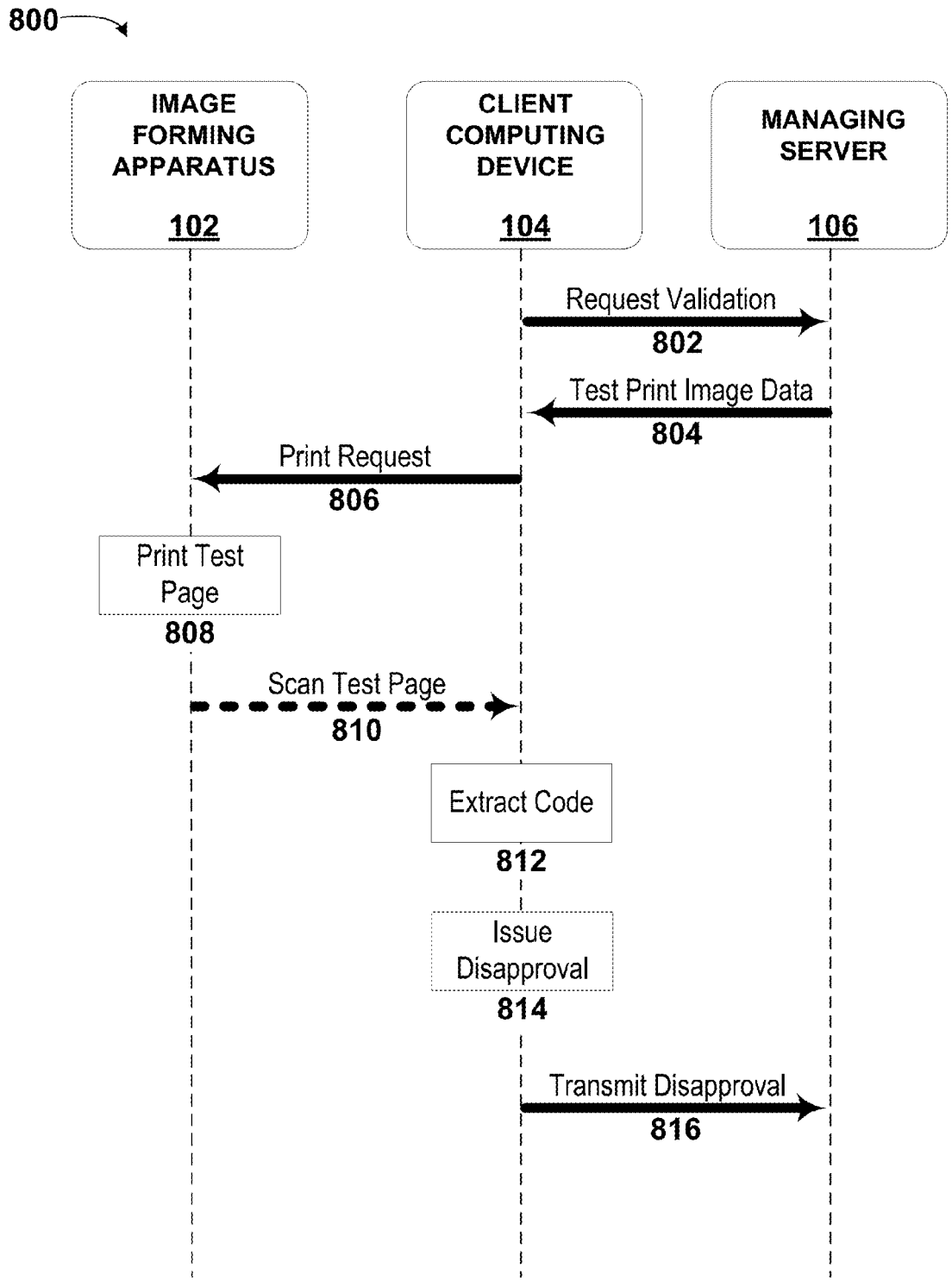
FIG. 8 is a data flow diagram illustrating another method, according to example embodiments.

FIG. 8 is a data flow diagram illustrating another image forming apparatus verification method 800, according to example embodiments. The method is carried out by the image forming apparatus 102, the client computing device 104, and the managing server 106.

Steps 802, 804, 806, 808, and 810 are analogous to steps 402, 404, 406, 408, and 410 of method 400, respectively. Please see the detailed description of method 400 for further details regarding these steps.

At step 812, the method 800 includes the client computing device 104 extracting the code contained within the printed test page 500, similar to step 412 of method 400.

At step 814, the method 800 includes the client computing device 104 evaluating the extracted code and determining that it does not match the code contained with the test print image data received in step 804 and the print request transmitted in step 806. Therefore, the client computing device issues a disapproval in step 814.

Additionally, an error in the code may be identified if the client computing device 104 reads a nonsensical code (e.g., a 4 digit code when the code is only defined to be 5 digits).

At step 816, the method 800 includes the client computing device 104 transmitting a disapproval message to the managing server 106 to indicate that a disapproved code was scanned from the printed test page 500. This disapproval message may indicate to the managing server 106 not to expect a code transmission from the client computing device 104, and to conclude the verification process.

Figure 9A:
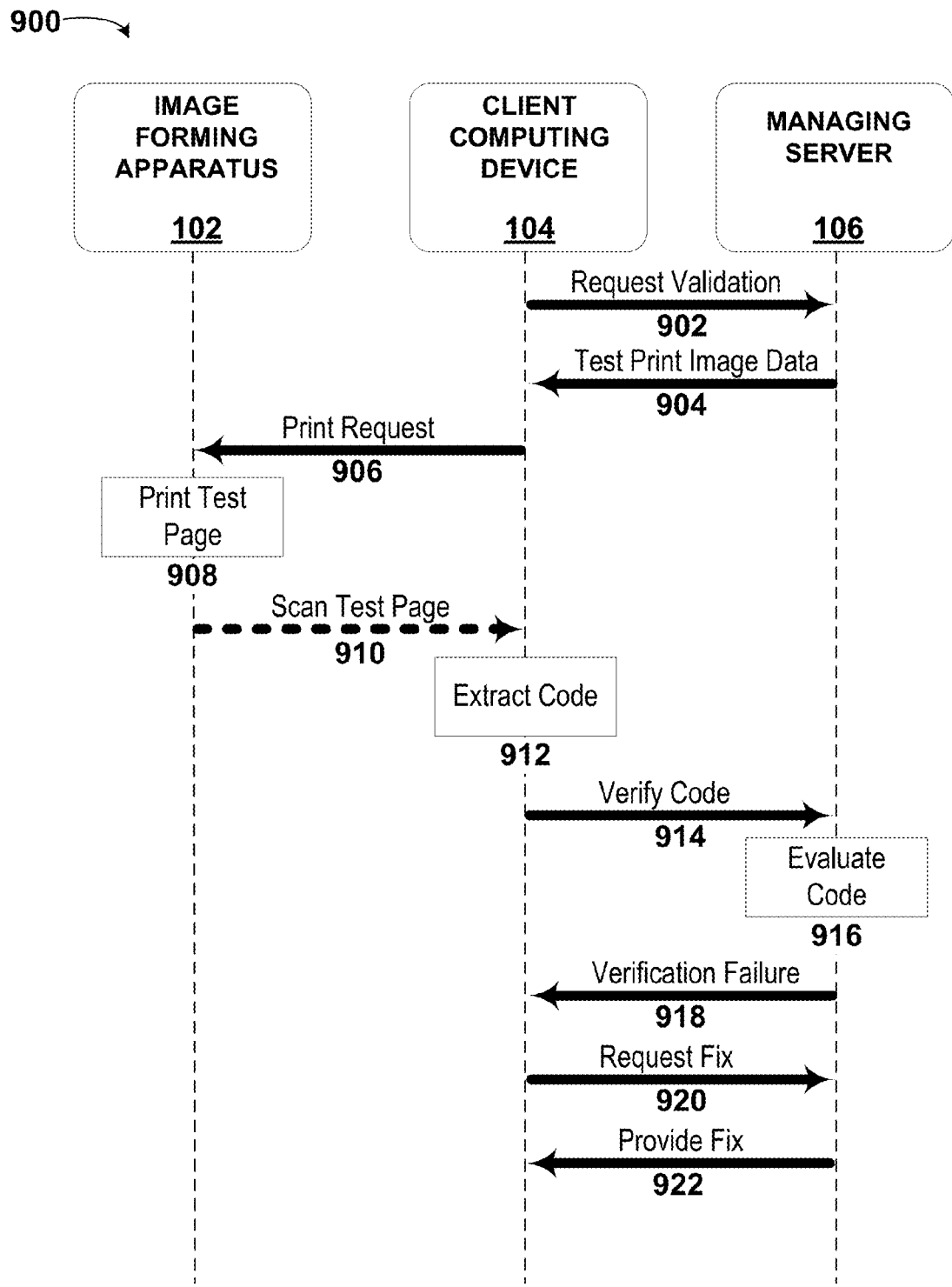
FIG. 9*a* is a data flow diagram illustrating another method, according to example embodiments.
Figure 9B:
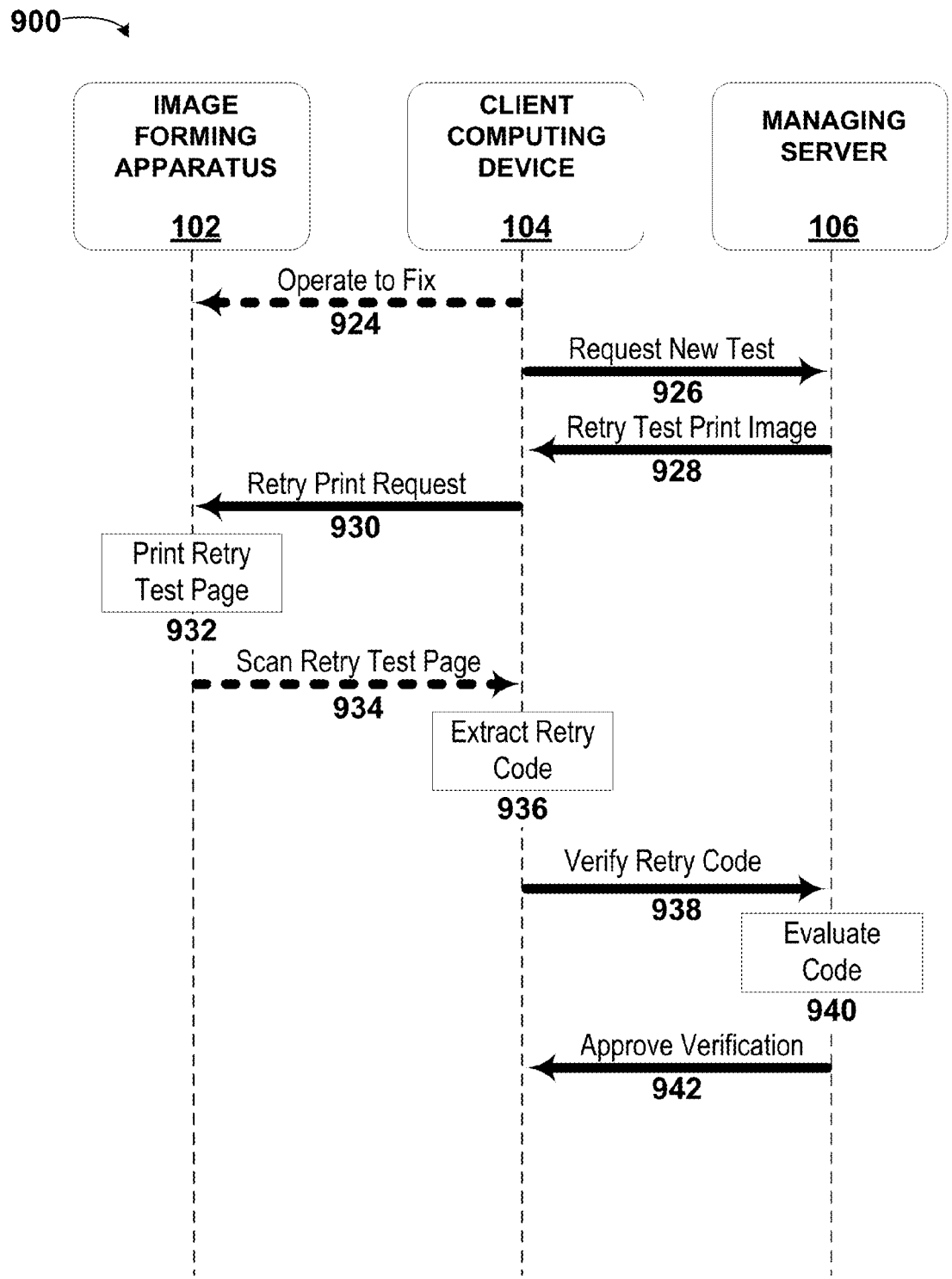
FIG. 9*b* is an extension of the data flow diagram presented in FIG. 9*a*.

FIGS. 9*a* and 9*b* comprise a data flow diagram illustrating another image forming apparatus verification method 900, according to example embodiments (FIG. 9*b* depicts the steps occurring subsequent to the steps occurring in FIG. 9*a*). The method 900 is carried out by the image forming apparatus 102, the client computing device 104, and the managing server 106.

Steps 902, 904, 906, 908, 910, 912, and 914 are analogous to steps 402, 404, 406, 408, 410, 412, and 414 of method 400, respectively. Please see the detailed description of method 400 for further details regarding these steps.

At step 916, the method 900 includes the managing server 106 evaluating the code transmitted by the client computing device 104. In this embodiment, the managing server 106 determines in step 916 that the code transmitted by the client computing device 104 in step 914 does not match the code transmitted by the managing server 106 in step 904. Therefore, the managing server 106 determines that the image forming apparatus 102 should not be verified.

Because the code was unsuccessfully verified, step 916 may further include generating a disapproval message for transmission to the client computing device 104. The disapproval message indicates to the client computing device 104 that the verification of the image forming apparatus 102 failed.

At step 918, the method 900 includes the managing server 106 transmitting the disapproval message to the client computing device 104. This may include the managing server 106 transmitting an error code or error message indicating what problems were contained within the code, and why a verification failure occurred.

At step 920, the method 900 includes the client computing device 104 transmitting a request to the managing server 106 to fix the image forming apparatus 102. This may constitute a request by the client computing device for information regarding how to service the image forming apparatus 102 to improve functionality and resolve printing errors.

At step 922, the method 900 includes the managing server 106 responding to the request transmitted by the client computing device 104 in step 920. Step 922 includes the managing server 106 issuing instructions to the client computing device 102 indicating which actions to perform on the image forming apparatus 102 to fix it. This may include remote corrections, such as rebooting the image forming apparatus 102 or initiating a native cleaning method within the image forming apparatus 102 (i.e., cleaning utilities or maintenance utilities that are built-in to and can be executed independently by the image forming apparatus 102). Alternatively, the fix provided by the managing server 106 in step 922 may include instructions for manually manipulating the image forming apparatus 102 by a user. Such fixes may include replacing toner cartridges, adding more paper to a paper tray, or clearing a paper jam.

At step 924, the method 900 includes the client computing device 104 operating to fix the image forming apparatus 102. This may include a user manually performing operations on the image forming apparatus 102, as well as the client computing device 104 transmitting instructions to the image forming apparatus 102 for self-correction.

At step 926, the method 900 includes the client computing device 104 transmitting a request for a new verification test to the managing server 106. This may include the client computing device 104 transmitting the results of the previous verification test, the details of the test, or the current status of the image forming apparatus 102 indicating that it has been recently fixed. In addition, the request transmitted in step 926 may be a request to initiate a new verification using the same code as before or may be a request to initiate a verification using an entirely different code.

At step 928, the method 900 includes the managing server 106 transmitting to the client computing device 104 retry test print image data. This data may indicate that it is intended to be used as a retry case. Alternatively, the data may be the same as normal test print image data, even though it is being transmitted as a retry case.

At step 930, the method 900 includes the client computing device 104 transmitting a retry print request to the image forming apparatus 102. This retry print request may contain the retry test print image data transmitted by the managing server 106 in step 928.

At step 932, the method 900 includes the image forming apparatus printing the retry test page.

At step 934, the method 900 includes the client computing device scanning the retry test page. As with step 410 of method 400, this may involve the client computing device utilizing a scanning element or a digital camera to capture an image of the printed test page.

At step 936, the method 900 includes the client computing device 104 extracting a code from the printed retry page that was printed in step 932 and scanned in step 934. The code extracted in step 936 may be the same code that would have been extracted in step 912 had the image forming apparatus 102 printed it correctly, in some embodiments.

At step 938, the method 900 includes the client computing device 104 transmitting the retry code that was extracted in step 936 to the managing server 106 for verification.

At step 940, the method 900 includes the managing server 106 attempting to validate the retry code against the code that was contained in the retry test print image data transmitted by the managing server 106 to the client computing device 104 in step 928.

At step 942, the method 900 includes the managing server 106 transmitting a message to the client computing device 104 indicating that the code sent by the client computing device 104 in step 938 and the image forming apparatus 102 were both successfully verified.

Figure 10:
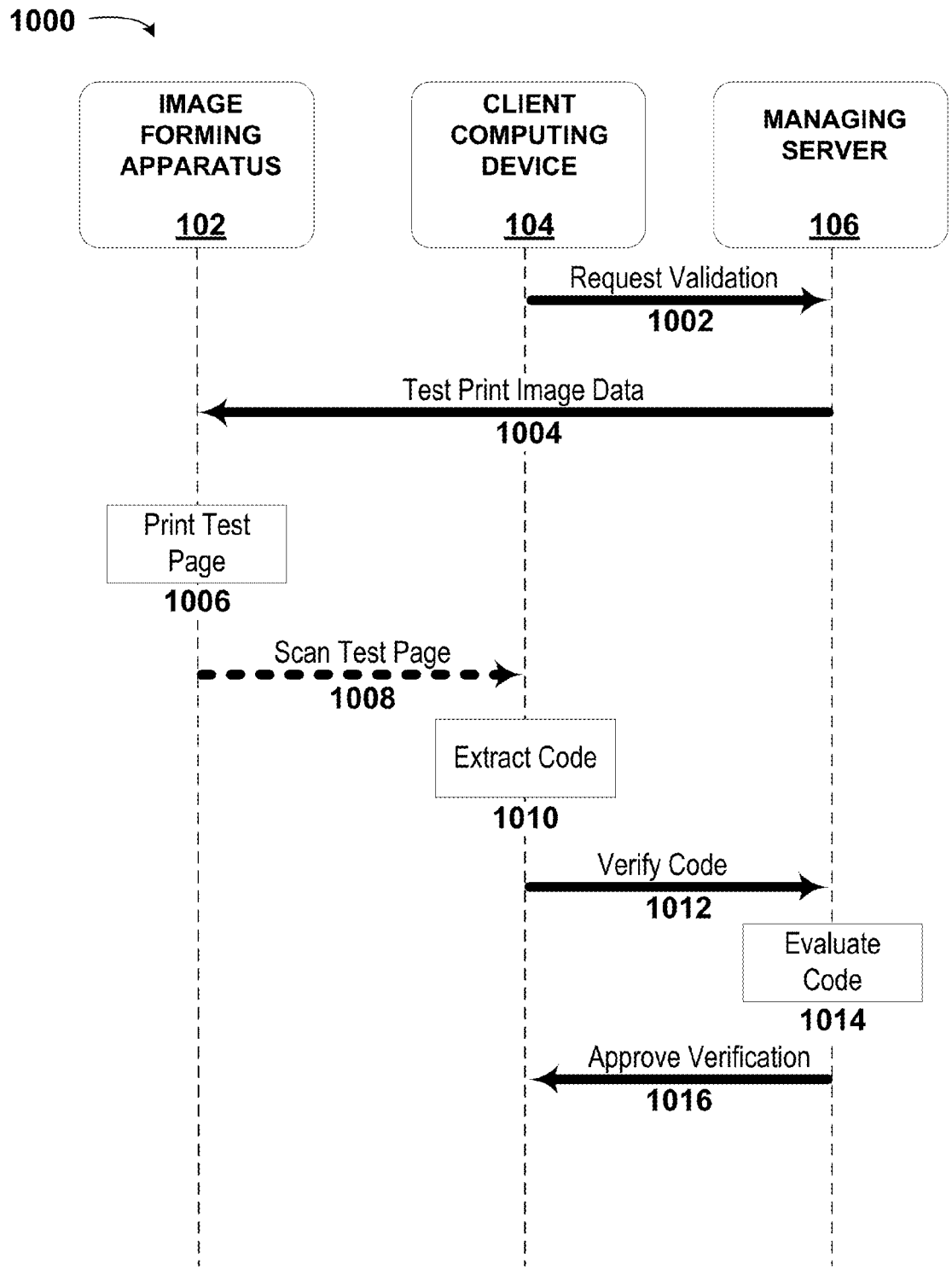
FIG. 10 is a data flow diagram illustrating another method, according to example embodiments.

FIG. 10 is a data flow diagram illustrating another image forming apparatus verification method 1000, according to example embodiments. The method is carried out by the image forming apparatus 102, the client computing device 104, and the managing server 106. The verification method 1000 illustrated in FIG. 10 is analogous to the verification method illustrated in FIG. 4. The primary difference is that the test print image data is transmitted directly from the managing server 106 to the image forming apparatus 102, without first being transmitted to the client computing device 104.

At step 1002, the method 1000 includes the client computing device 104 transmitting a request to the managing server 106 to initiate a validation method. Similar to step 402 of method 400, this may occur using an application within the client computing device 104. This request may contain certain information about the image forming apparatus 102 or the requested validation.

At step 1004, the method 1000 includes the managing server 106 transmitting test print image data to the image forming apparatus 102. The test print image data may be legible by the image forming apparatus 102 as transmitted. Alternatively, the test print image data may require conversion to a different format within the image forming apparatus 102 prior to printing.

The remaining steps of method 1000 (steps 1006, 1008, 1010, 1012, 1014, and 1016) are analogous to steps 408, 410, 412, 414, 416, and 418 of method 400, respectively. Please see the detailed description of method 400 for further details regarding these steps.

Figure 11:
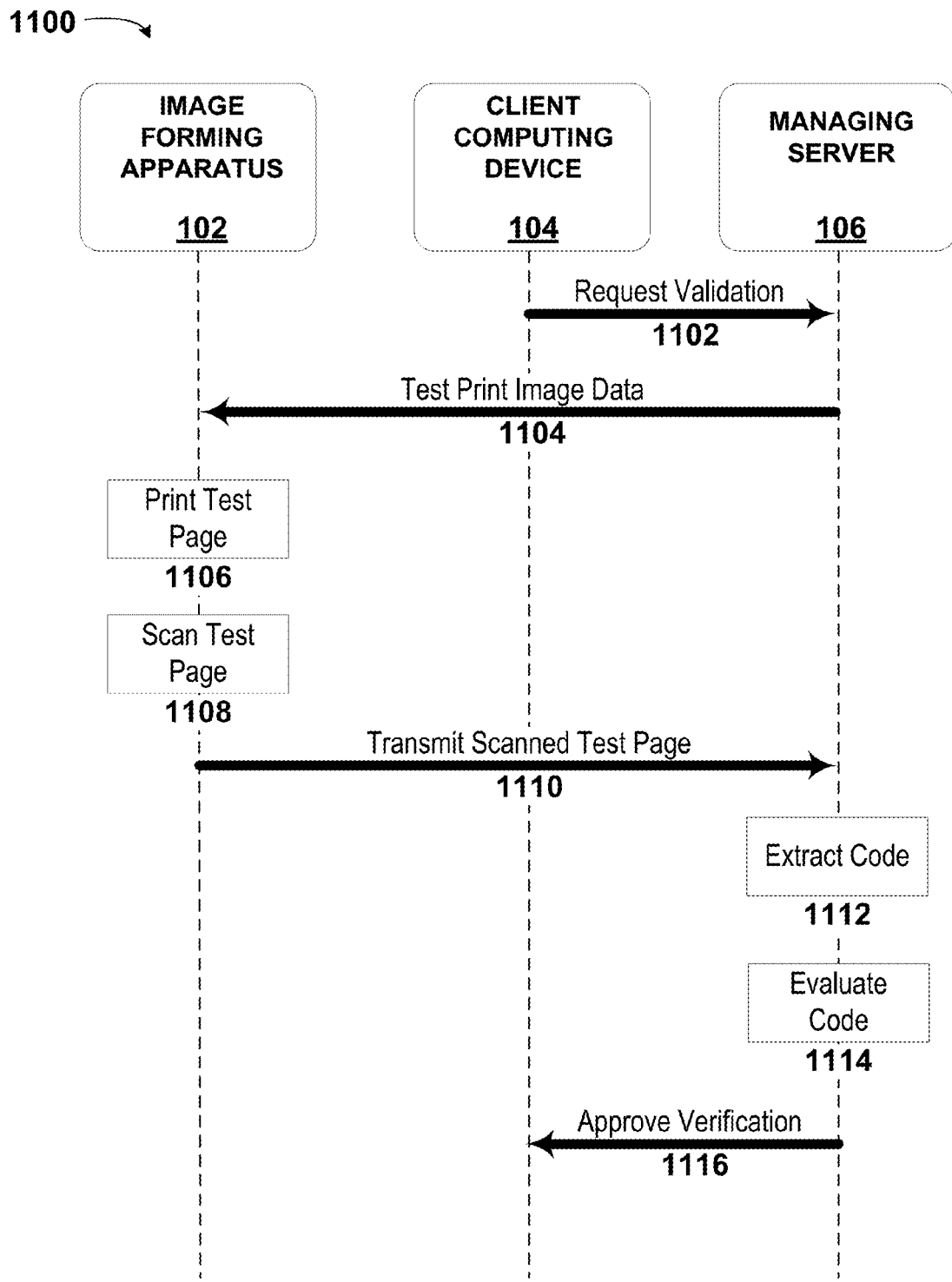
FIG. 11 is a data flow diagram illustrating another method, according to example embodiments.

FIG. 11 is a data flow diagram illustrating another image forming apparatus verification method 1100, according to example embodiments. The method is carried out by the image forming apparatus 102, the client computing device 104, and the managing server 106. The verification method 1100 illustrated in FIG. 11 is analogous to the verification method illustrated in FIG. 4. The primary differences are (i) that the test print image data is transmitted directly from the managing server 106 to the image forming apparatus 102, without first being transmitted to the client computing device 104 and (ii) that the scanned test page is transmitted from the image forming apparatus 102 to the managing server 106 for analysis, rather than using the client computing device 104 to analyze the test page.

At step 1102, the method 1100 includes the client computing device 104 transmitting a request to the managing server 106 to initiate a validation method. Similar to step 402 of method 400, this may occur using an application within the client computing device 104. This request may contain certain information about the image forming apparatus 102 or the requested validation.

At step 1104, the method 1100 includes the managing server 106 transmitting test print image data to the image forming apparatus 102. The test print image data may be legible by the image forming apparatus 102 as transmitted. Alternatively, the test print image data may require conversion to a different format within the image forming apparatus 102 prior to printing.

At step 1106, the method 1100 includes the image forming apparatus 102 printing the test page from the test page image data.

At step 1108, the method 1100 includes the image forming apparatus 102 scanning the printed test page. This may include the image forming apparatus 102 transferring the printed test page from the output tray 202 to the scanning element 208 and then initiating a scanning action using the scanning element 208. In alternative embodiments, this may include a digital camera mounted above the output tray 202 taking a digital photograph of the printed test page.

At step 1110, the method 1100 includes the image forming apparatus 102 transmitting data representing the scanned test page to the managing server 106.

At step 1112, the method 1100 includes the managing server 106 attempting to extract the code from the scanned test page data. The managing server 106 may use code extraction techniques similar to those used by the client computing device 104 in step 412 of method 400. Please see the detailed description of method 400 for further details regarding these techniques.

At step 1114, the method 1100 includes the managing server 106 evaluating the extracted code. This is analogous to step 416 of method 400. Please see the detailed description of method 400 for further details regarding step 1114.

At step 1116, the method 1100 includes the managing server 106 transmitting a message to the client computing device 104 that indicates that the verification of the code was completed successfully and that the image forming apparatus 102 has been verified by the managing server 106.

Figure 12:
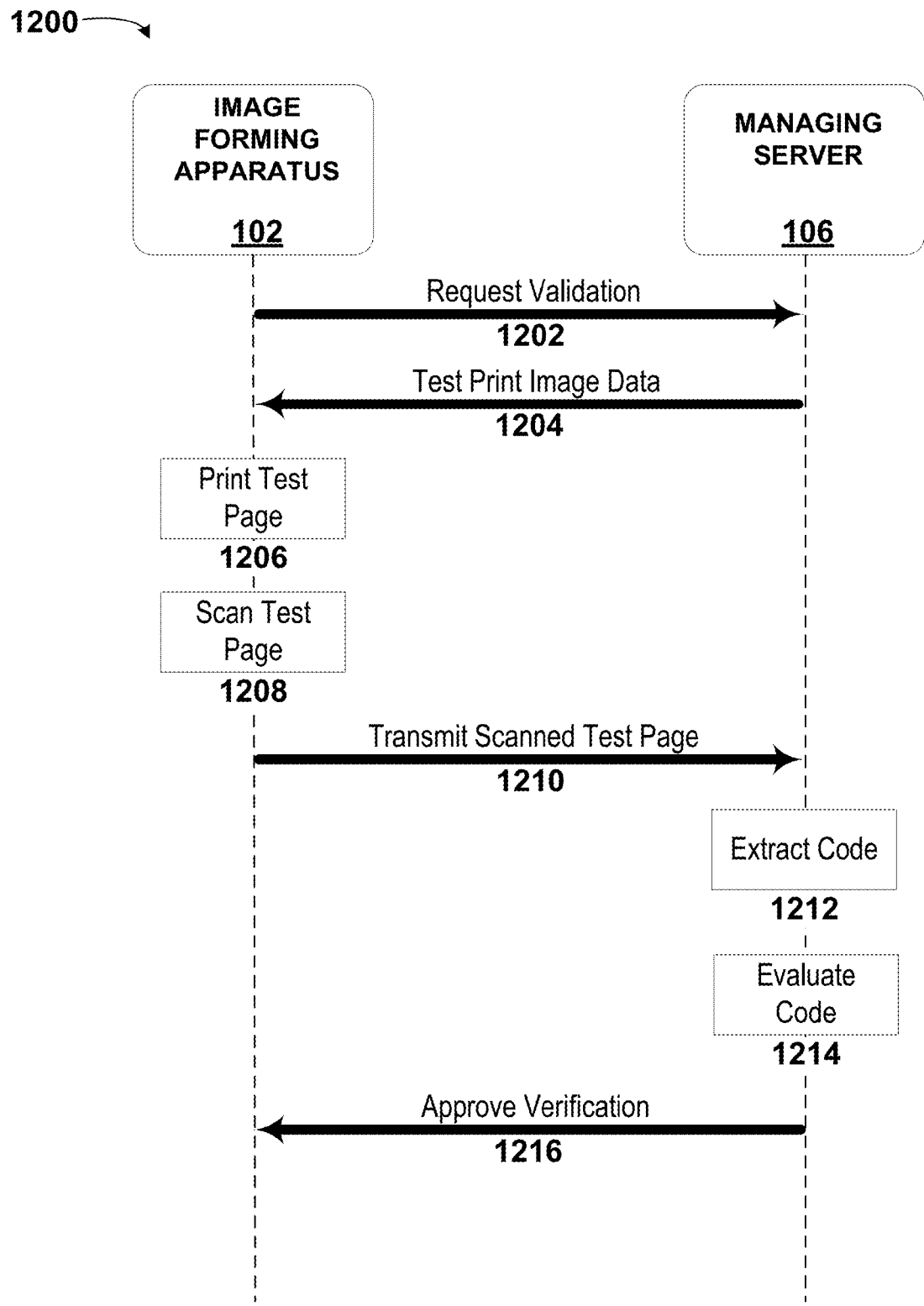
FIG. 12 is a data flow diagram illustrating another method, according to example embodiments.

FIG. 12 is a data flow diagram illustrating another image forming apparatus verification method 1200, according to example embodiments. The method is carried out by the image forming apparatus 102 and the managing server 106. The verification method 1200 illustrated in FIG. 12 is analogous to the verification method 400 illustrated in FIG. 4. The primary difference is the image forming apparatus 102 is communicating directly with the managing server 106 without the intermediary of the client computing device 104

At step 1202, the method 1200 includes the image forming apparatus 102 transmitting a request to the managing server 106 to initiate a validation method. Similar to step 402 of method 400, this may occur using an application within the image forming apparatus 102. This request may contain certain information about the image forming apparatus 102 or the requested validation.

Furthermore, step 1202 may also include a user initiation of a validation of the image forming apparatus 102. This may occur through interaction with the user interface 206.

At step 1204, the method 1200 includes the managing server 106 transmitting test print image data to the image forming apparatus 102. The test print image data may be legible by the image forming apparatus 102 as transmitted. Alternatively, the test print image data may require conversion within the image forming apparatus 102 prior to printing.

At step 1206, the method 1200 includes the image forming apparatus 102 printing the test page from the test page image data.

At step 1208, the method 1200 includes the image forming apparatus 102 scanning the printed test page. This may include the image forming apparatus 102 transferring the printed test page from the output tray 202 to the scanning element 208 and then initiating a scanning action using the scanning element 208. In alternative embodiments, this may include a digital camera mounted above the output tray 202 taking a digital photograph of the printed test page.

At step 1210, the method 1200 includes the image forming apparatus 102 transmitting data representing the scanned test page to the managing server 106.

At step 1212, the method 1200 includes the managing server 106 attempting to extract the code from the scanned test page data. The managing server 106 may use code extraction techniques similar to those used by the client computing device 104 in step 412 of method 400. Please see the detailed description of method 400 for further details regarding these techniques.

At step 1214, the method 1200 includes the managing server 106 evaluating the extracted code. This is analogous to step 416 of method 400. Please see the detailed description of method 400 for further details regarding step 1214.

At step 1216, the method 1200 includes the managing server 106 transmitting a message to the image forming apparatus 102 that indicates that the verification of the code was completed successfully and that the image forming apparatus 102 has been verified by the managing server 106.

IV. Conclusion

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration only and are not intended to be limiting, with the true scope being indicated by the following claims.

What is claimed is:

1. An image forming apparatus management system, comprising:
    an image forming apparatus, wherein the image forming apparatus is configured to print a test page, and wherein the test page comprises a code: and
    a client computing device, wherein the client computing device is configured to:
    transmit a test print data request to a managing server;
    transmit a test page print request to the image forming apparatus;
    scan the test page;
    extract the code from the scanned test page: and
    transmit the code extracted from the scanned test page to the managing server,
        wherein the managing server is configured to:
            transmit test print data to the client computing device, wherein the test print data comprises a code used to confirm that the image forming apparatus is functioning correctly;
            verify the code extracted from the scanned test page against the code transmitted to the client computing device in the test print data;
            wherein the client computing device is further configured to determine whether the code extracted from the scanned test page matches the code transmitted to the client computing device in the test print data; and
            wherein the code transmitted to the client computing device in the test print data is alphanumeric, and wherein the code transmitted to the client computing device comprises a string of characters representing a password usable by the client computing device to log into the managing server when the code extracted from the scanned test page matches the code transmitted to the client computing device in the test print data.

2. The image forming apparatus management system of claim 1, wherein the client computing device utilizes a scanner or a camera to scan the test page.

3. The image forming apparatus management system of claim 1, wherein the test print data comprises a Quick Response (QR) code or a barcode.

4. The image forming apparatus management system of claim 3, wherein the QR code comprises each of the primary colors from the CMYK (cyan, magenta, yellow, and key) color model.

5. The image forming apparatus management system of claim 3, wherein the QR code comprises each of the primary colors from the RGB (red, green, and blue) color model.

6. The image forming apparatus management system of claim 1, wherein the client computing device executes an application (app) to scan the test page and transmit the code extracted from the scanned test page to the managing server, and wherein the app comprises an application title, a test page scan button, a code analysis section, a status indicator, and a transmit button.

7. The image forming apparatus management system of claim 1, wherein the test print data comprises text which can be evaluated using Optical Character Recognition (OCR).

8. The image forming apparatus management system of claim 1, wherein the client computing device is a mobile computing device, a tablet computing device, or a desktop computing device.

9. The image forming apparatus management system of claim 1, wherein the image forming apparatus comprises a plurality of toner colors, and wherein the code transmitted to the client computing device in the test print image data comprises various colors placed such that the code transmitted to the client computing device would change, when printed, if at least one of the toner colors were empty.

10. The image forming apparatus management system of claim 9, wherein the managing server is further configured to disapprove of the image forming apparatus based on the code extracted from the scanned test page when the code transmitted to the client computing device is not printed correctly by the image forming apparatus because at least one of the toner colors is empty.

11. The image forming apparatus management system of claim 1, wherein the managing server is further configured to transmit an approval notification to the client computing device, and wherein the transmission of the approval notification denotes that the code extracted from the scanned test page was successfully verified against the code transmitted to the client computing device in the test print data.

12. The image forming apparatus management system of claim 11, wherein transmitting, by the managing server, an approval notification to the client computing device further comprises adding the image forming apparatus to a list of approved image forming apparatuses within the managing server, and wherein the list contains metadata regarding the image forming apparatus.

13. The image forming apparatus management system of claim 1, wherein the managing server is further configured to transmit a disapproval notification to the client computing device, and wherein the transmission of the disapproval notification denotes that the code extracted from the scanned test page was not successfully verified against the code transmitted to the client computing device in the test print data.

14. The image forming apparatus management system of claim 1, wherein the client computing device is a component of the image forming apparatus.

15. The image forming apparatus management system of claim 11, wherein, upon receiving the approval notification, the client computing device is further configured to transmit the scanned test page, in its entirety, to the managing server.

16. The image forming apparatus management system of claim 1, wherein scanning the test page by the client computing device comprises performing a photographic enhancement or manipulation process in order to verify a number of colors on the test page.

17. A method for managing an image forming apparatus, comprising:
    receiving, by a managing server, a test print data request;
    transmitting, by the managing server, test print data, wherein the test print data comprises a code used to confirm that the image forming apparatus is functioning correctly:
    receiving, by the image forming apparatus, a test page print request wherein the test page print request comprises the test print data:
    printing, by the image forming apparatus, a test page, wherein the test page comprises a code:
    scanning, by a client computing device, the test page;
    extracting, by the client computing device, the code from the scanned test page;
    determining, by the client computing device, whether the code extracted from the scanned test page matches the code in the test print data;
    receiving, by the managing server from the client computing device, the code extracted from the scanned test page;
    verifying, by the managing server, the data code extracted from the scanned from the test page against the code in the test print data; and
    wherein the code transmitted to the client computing device in the test print data is alphanumeric, and wherein the code transmitted to the client computing device comprises a string of characters representing a password usable by the client computing device to log into the managing server when the code extracted from the scanned test page matches the code transmitted to the client computing device in the test print data.

18. The method of claim 17, further comprising transmitting, by the managing server, an approval notification to the client computing device, wherein the transmission of the approval notification denotes that the code extracted from the scanned test page was successfully verified against the code in the test print data.

19. An image forming apparatus, wherein the image forming apparatus is configured to:
    transmit a test print data request to a managing server;
    print a test page, wherein the test page comprises a code;
    scan the test page; and
    transmit data scanned from the test page to the managing server, wherein the managing server is further configured to:
    transmit a test page print request to the image forming apparatus, wherein the test page print request comprises test print data, and wherein the test print data comprises a code used to confirm that the image forming apparatus is functioning correctly;
    extract the code from the scanned test page;
    verify the code extracted from the scanned test page against the code transmitted to the image forming apparatus in the test print data;
    transmit, to the image forming apparatus, a message that indicates that the verification of the code was completed successfully and that the image forming apparatus has been verified by the managing server; and
    wherein the code transmitted to the client computing device in the test print data is alphanumeric, and wherein the code transmitted to the client computing device comprises a string of characters representing a password usable by the client computing device to log into the managing server when the code extracted from the scanned test page matches the code transmitted to the client computing device in the test print data.

* * * * *